United States Patent [19]

Thorson

[11] 4,097,799
[45] Jun. 27, 1978

[54] ELECTRICAL INDICATOR INCLUDING RELATIVELY TRANSLATABLE SCALE AND INDEX TAPES

[75] Inventor: Eric K. Thorson, Seattle, Wash.
[73] Assignee: Eldec Corporation, Lynnwood, Wash.
[21] Appl. No.: 798,817
[22] Filed: May 20, 1977
[51] Int. Cl.² .................. G01R 17/06; G09F 9/00
[52] U.S. Cl. ................................ 324/99 R; 116/135
[58] Field of Search ............... 324/99 R, 115, 131; 116/129 AB, 135

[56] References Cited

U.S. PATENT DOCUMENTS 3,182,631  5/1965  Gomes .............................. 116/135
3,187,713  6/1965  Fenwick ............................ 116/135

*Primary Examiner*—Rudolph V. Rolinec
*Assistant Examiner*—Ernest F. Karlsen
*Attorney, Agent, or Firm*—Christensen, O'Connor, Johnson & Kindness

[57] ABSTRACT

An electrical indicator is disclosed of the type including a housing with an elongated window therein, and an elongated scale and an adjacent, relatively-translatable index carried on an elongated tape loop, both viewable through the window. The indicator provides increased resolution over such indicators known to the prior art by placing the elongated scale also on a tape which is made translatable past the window but in a direction opposite to that of the tape carrying the index. Both tapes are driven by the same drum forming part of a DC torque motor, but are taken off a peripheral surface of that drum in opposite directions to achieve opposite translations of the tapes past the window. An electrical circuit for controlling the DC torque motor is disclosed, as are details of the DC torque motor and associated components of the electrical indicator.

10 Claims, 11 Drawing Figures

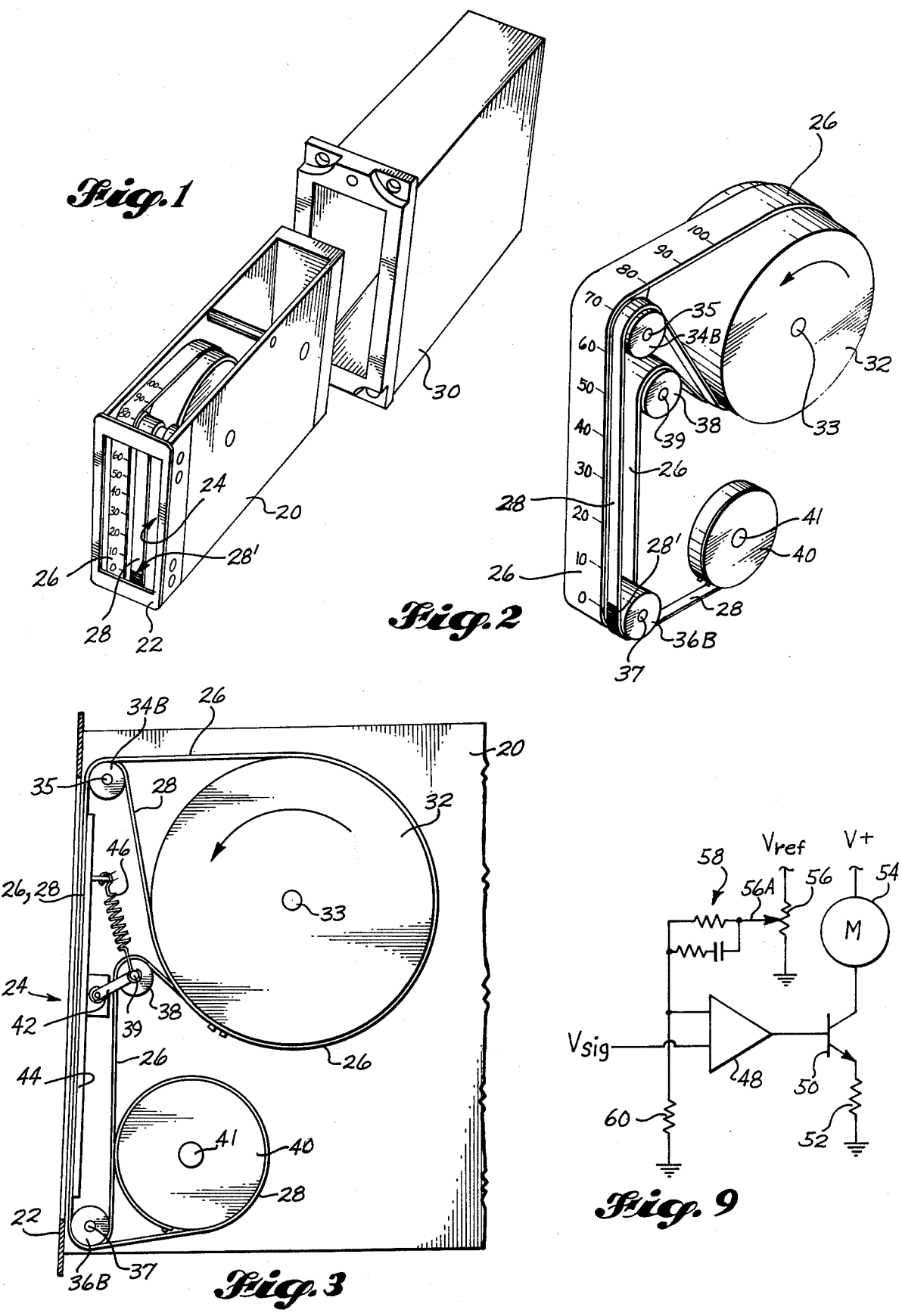

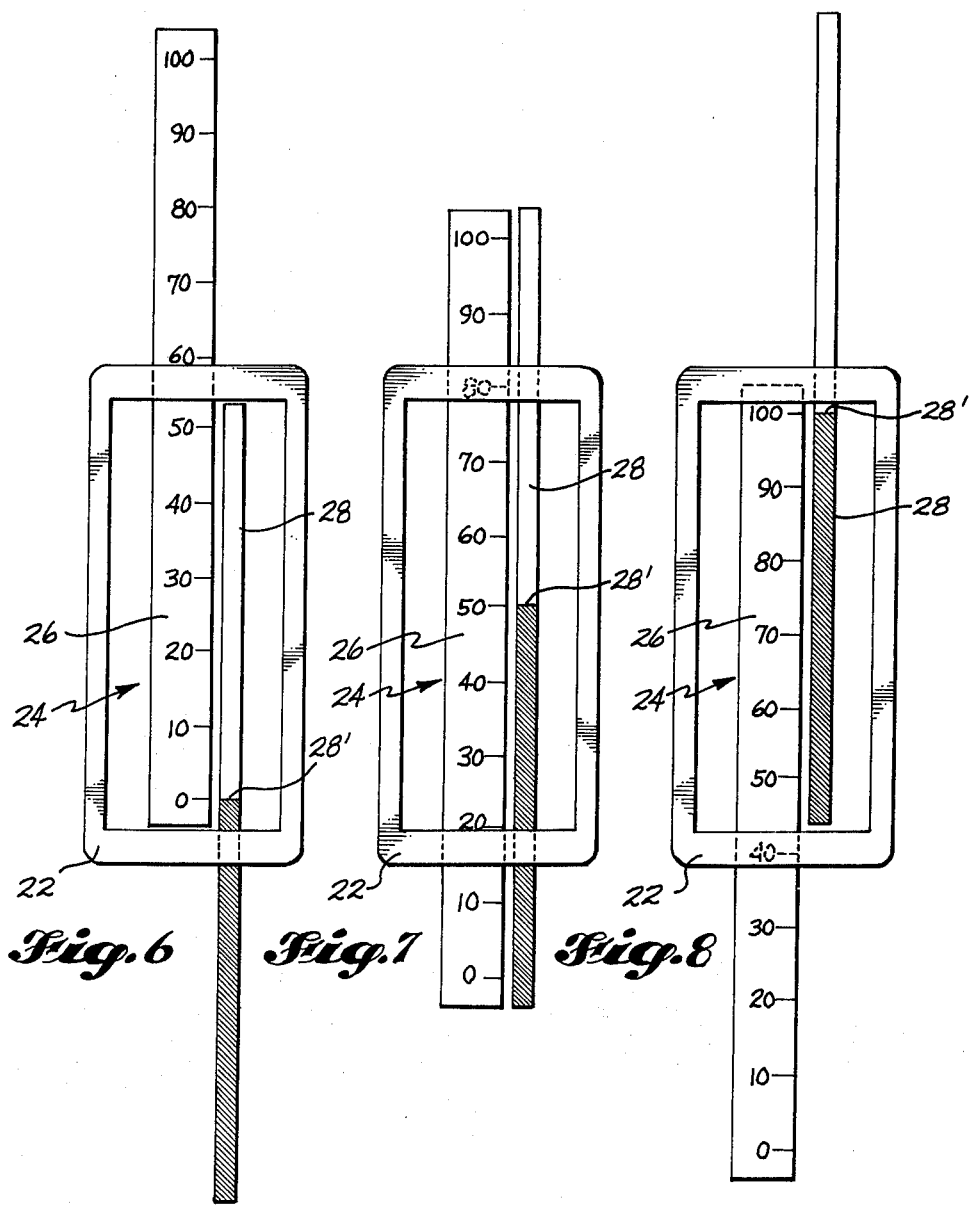
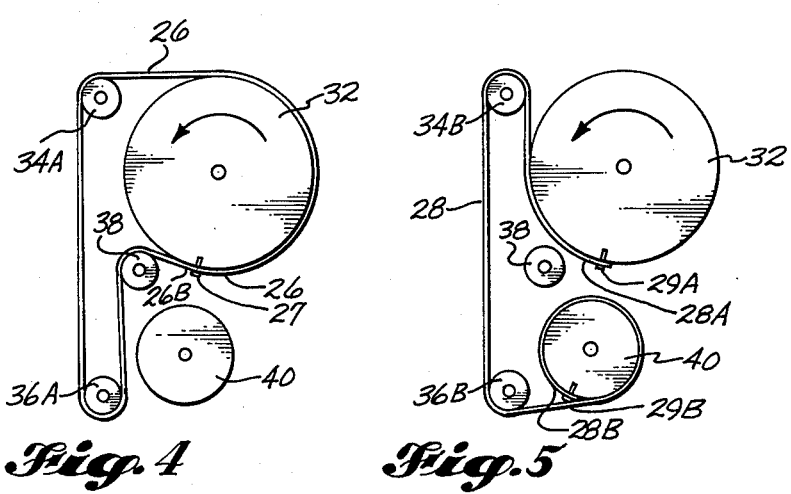

ELECTRICAL INDICATOR INCLUDING RELATIVELY TRANSLATABLE SCALE AND INDEX TAPES

FIELD OF THE INVENTION

This invention generally relates to electrical indicators, and, more particularly, to such indicators having an elongated scale and an index which is carried on a tape which is translatable with respect to the elongated scale.

BACKGROUND OF THE INVENTION

Electrical indicators are known to the prior art which include a fixed, elongated scale and an adjacent, relatively-translatable index. Typically, the index is carried on an elongated tape loop which is supported by rollers located adjacent both ends of the fixed scale and which passes around a rotatable drum located behind the scale. The drum is rotated by a motor in proportion to the magnitude of the signal being measured.

One of the disadvantages of this type of electrical indicator, particularly where the indicator is of small size with a vertically-oriented scale for aircraft use, is the limited resolution available due to the fixed and short length of the scale.

One approach in the prior art to increasing the resolution of such indicators is to expand a portion of the fixed scale while compressing the remaining portions of the fixed scale. It can be appreciated that this approach, particularly as applied to small indicators of the vertical scale type, severely reduces the resolution of the compressed portions of the scale and results in an indicator which is usable only over a very small range of the input signal.

Another approach known to the prior art is to provide a separate digital display in conjunction with such indicators. While such digital displays can provide increased resolution, there is a resultant increase in complexity and power dissipation of the total indicator. Digital displays are also subject to the shortcoming that they do not accurately represent the trend, or rate of change, of the input signal, and therefore are not particularly useful where the input signal is being controlled with reference to the display.

It is therefore an object of this invention to provide an electrical indicator, of the type including an elongated scale and an index which is carried on a tape translatable with respect to the scale, which provides substantially increased resolution over electrical indicators of this type known to the prior art.

It is another object of this invention to provide such an electrical indicator which provides increased resolution while yet requiring little or no increase in power consumption.

It is a further object of this invention to provide such an electrical indicator whose resolution is at least twice that of prior electrical indicators of this type over the entire scale of the indicator.

It is still a further object of this invention to provide such an electrical indicator which achieves such increased resolution by the use of very few components in addition to those normally found in prior art electrical indicators.

SUMMARY OF THE INVENTION

These objects and others, which will be apparent to those considering the remainder of the specification herein, are achieved, briefly, in an electrical indicator which comprises a housing having defined therein an elongated window having first and second ends. A drive means is supported within the housing and has a drum rotatable in response to an electrical signal. A first elongated tape has an index located thereon, with the first tape having a first end attached to a peripheral surface of the drum. First and second guide means for the first elongated tape are supported within the housing in proximity to the first and second ends of the elongated window, respectively. A reel means is also supported within the housing, with the first tape passing from its first end in a first circumferential direction around a portion of the peripheral surface of the drum, over the first guide means and then over the second guide means to terminate in a second end attached to a peripheral surface of the reel means. The reel means tends to cause the first tape to translate in a first direction past the window and the drive means rotates the drum in response to the electrical signal to tend to cause the first tape to translate in a second, opposite direction past the window.

Third and fourth guide means for a second elongated tape are supported within the housing in proximity to the first and second ends of the window and adjacent to the first and second guide means, respectively. The second elongated tape has a plurality of spaced scale markings located thereon, with the first end of the second tape being attached to the peripheral surface of the drum so that the second tape lies on the peripheral surface in spaced, parallel relationship to the first tape. The second tape passes around the second portion of the peripheral surface in a second circumferential direction, opposite to the first circumferential direction, over the third guide means, and then over the fourth guide means to terminate in a second end attached to the peripheral surface of the drum at a location adjacent the first end of the second tape. Means are supported within the housing for tensioning the second tape as it passes around and over the drum and the third and fourth guide means, whereby the second tape translates in the first and second directions past the window as the first tape translates in the second and first directions past the window, respectively, in response to the forces exerted on the first and second tapes by the drive means and the reel means.

BRIEF DESCRIPTION OF THE DRAWINGS

The invention can perhaps best be understood by reference to the following portion of the specification, taken in conjunction with the accompanying drawings in which:

FIG. 1 is a pictorial view showing the electrical indicator of the present invention and a mounting case therefor;

FIG. 2 is a partially schematic and pictorial view illustrating the basic structure and operation of the present invention;

FIG. 3 is a partially schematic and side view generally corresponding to FIG. 2;

FIGS. 4 and 5 are schematic side views generally corresponding to FIG. 3 and illustrating the paths of travel of the scale and index tapes, respectively, of the present invention;

FIGS. 6, 7 and 8 are schematic, front views illustrating the relative displacements of the scale and index tapes of the present invention;

FIG. 9 is a schematic diagram of a representative circuit for controlling the scale and index tapes in response to an input signal;

DESCRIPTION OF A PREFERRED EMBODIMENT

Figure 10:
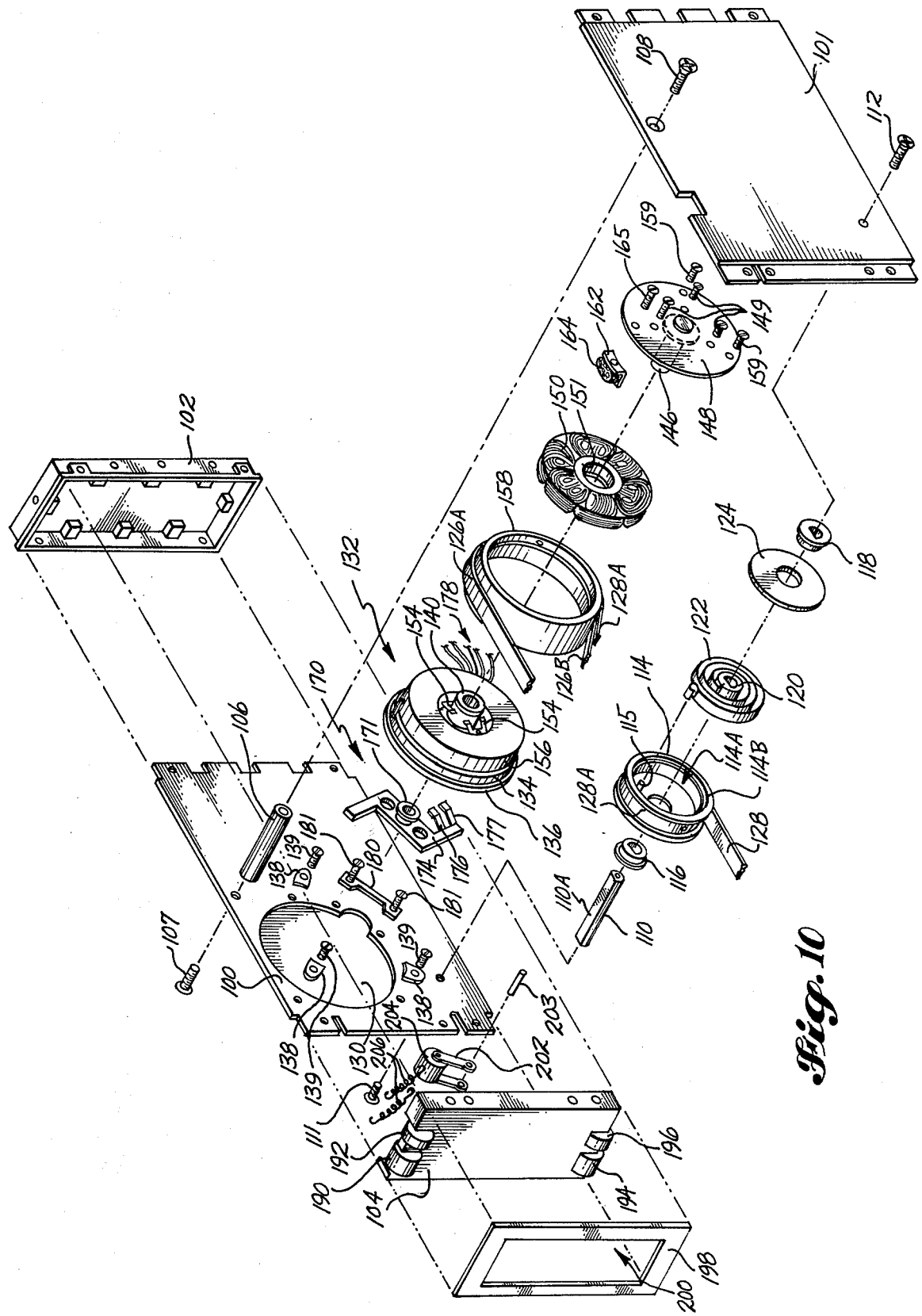
FIG. 10 is an exploded, pictorial view of a preferred embodiment of the electrical indicator; and, FIG. 11 is a cross-sectional view of the electrical indicator in FIG. 10.

With reference now to FIG. 1, the electrical indicator of the present invention is mounted in an elongated, substantially rectangular housing 20 which has at its forward end a face plate 22 which contains a window 24 through which may be viewed a portion of a first elongated tape 26 having located thereon a plurality of scale markings (hereinafter referred to as the "scale" tape) and a portion of a second elongated tape 28 which has located thereon an index 28' (hereinafter referred to as the "index" tape). The housing 20 is adapted to be received in a cavity in a case 30 which protects the electrical indicator and which can be used to mount the electrical indicator in a suitable panel.

Now referring to FIGS. 2-5, movement of the scale tape 26 and the index tape 28 past the window 24 is accomplished by driving both of those tapes from a common drum 32 forming part of a drive means such as a DC torque motor, not illustrated, having a shaft 33 coupled to drum 32. In the present invention, both the scale tape 26 and the index tape 28 are made translatable past the window 24, but in opposite directions. To achieve this relative movement, an arrangement is provided whereby the scale tape 26 is taken on and off the drum 32 in a direction opposite to that of the index tape 28.

Specifically, the scale tape 26 and the index tape 28 are shown in FIGS. 2-5 in the rest positions that they would assume when no input signal is being applied to the electrical indicator, with the drum 32 rotating in a counterclockwise direction (as indicated by the arrows in FIGS. 2-5) from its rest position for increases in the input signal applied to the electrical indicator. A first end 26A of the scale tape 26 is affixed to a portion of the peripheral surface of the drum 32 by a rivet or other fastener 27. The scale tape 26 then passes around the peripheral surface of drum 32 in a counterclockwise direction, over a roller or guide means 34A (not illustrated in FIGS. 2, 3 and 5) supported on a shaft 35 located adjacent the top of the window 26, over a roller or guide means 36B (not illustrated in FIGS. 2, 3 and 5) on a shaft 37 located at the bottom of the window 24, and over a tensioning roller 38 supported on a shaft 39 to terminate in a second end 26B which is preferably also attached to the peripheral surface of the drum 32 by the rivet or fastener 27. The shaft 39 for the tensioning roller 38 is supported on a first end of an arm 42 whose second end is pivotally supported from a backing plate 44 which extends substantially parallel to and behind the face plate 22 in assembly, with the scale tape 26 (and index tape 28) passing between face plate 22 and backing plate 44. The arm 42 is pulled up to press the tensioning roller 38 against the scale tape 26 by a spring 46 also secured to backing plate 44.

A first end 28A of the index tape 28 is secured to the peripheral surface of the drum 32 by a rivet or other fastener 29A at a location adjacent the ends 26A, 26B of the scale tape 26. From the end 28A, the index tape 28 proceeds in a clockwise direction around a portion of the peripheral surface of drum 32, and then over portions of a roller or guide means 34B and a roller or guide means 36B, respectively supported on shafts 35 and 37 and adjacent to rollers 34A and 36B, and around the peripheral surface of a spring-biased reel 40, supported for rotation on a shaft 41, to terminate in a second end 28B which is affixed to the peripheral surface of reel 40 by a rivet or other fastener 29B. The spring biasing within reel 40 tends to turn the reel 40 in a counterclockwise direction to tension the index tape tape 28 and to return the index tape 28 to its rest position (and thus the scale tape 26 to its rest position due to the forces exerted on drum 32 by index tape 28) when no input signal is applied to the electrical indicator.

As can readily be appreciated, rotation of the drum 32 in a counterclockwise direction causes the index tape 28 to be taken up upon the peripheral surface of the drum 32 and off the peripheral surface of the reel 40, with the index 28' moving upwardly as viewed through window 24. At the same time, scale tape 26 is taken off the top of the peripheral surface of drum 32 and taken onto the bottom of the peripheral surface of drum 32 so that the scale thereon moves downwardly as viewed through window 24.

The relative movements of scale tape 26 and index tape 28 can best be visualized by referring to FIGS. 6-8 in which a substantial portion of each tape 26, 28 is laid flat in the plane of the face plate 22 and the window 24 therethrough. In FIG. 6, which illustrates the rest position of the electrical indicator, approximately one-half of the scale on the scale tape 26 (that is, from scale markings 0 to 50), is visible through the window 24, whereas the index 28' on the index tape 28 is barely visible at the bottom of the window 24. In FIG. 7, which illustrates a half-scale position of the electrical indicator, the scale tape 26 has moved downwardly with respect to the window 24 so that the scale markings from 20-70 are visible through window 24, whereas the index tape 28 has moved upwardly by an equal amount so that the index 28' is located approximately in the middle of window 24. In FIG. 8, which illustrates a full scale position of the electrical indicator, the scale tape 28 has moved further downwardly so that scale markings 50-100 are visible through the window 24, whereas the index tape 28 has moved further upwardly by an equal amount so that the index 28' is at the top of the window 24.

In short, the present invention provides a means whereby the scale may be made longer than the dimension dictated by the length of the window 24 in the direction of translation of the index tape 28 to achieve increased resolution over the indicators of the prior art. Let it be assumed that the scale tape 26 in FIG. 6 is fixed and bears thereon markings 0–100 visible through the window 24, as is typical of the prior art. It can then be seen that the electrical indicator of the present invention, by its use of the oppositely-translatable scale tape 26 and index tape 28, provides twice the resolution of such a prior art electrical indicator. In the illustration of the invention given in FIGS. 2-8, this increase in resolution is established at a 2 to 1 ratio inasmuch as the scale tape 26 and index tape 28 are taken off the same peripheral surface of the drum 32. In fact, the resolution increase afforded by the present invention may be tailored to any specific ratio by using different diameters for the portions of the peripheral surface of drum 32 around which the scale tape 26 and the index tape 28 pass.

Rotation of the drum 32, and therefore translation of the scale tape 26 and index tape 28, may be controlled by a circuit such as that shown in FIG. 9 in which the input signal to be measured and displayed ($V_{sig}$) is applied to the first input of a differential amplifier 48, whose output is coupled to the base electrode of a transistor 50. The collector and emitter electrodes of transistor 50 are connected in series with a DC torque motor 54, having a rotatable element coupled to drum 32, and a resistor 52 between a source of positive potential (V+) and ground. A feedback potentiometer 56 is also provided which is interconnected between a source of reference potential ($V_{ref}$) and ground and which has a wiper arm 56A rotatable with drum 32. The signal occurring on wiper arm 56A is therefore representative of the actual position of the drum 32 and is coupled to a second input of the differential amplifier 48 by an R-C network 58, with the second input of differential amplifier 48 being also coupled to ground through a resistor 60.

Assuming now that the drum 32 is in its rest position, the application of the input signal $V_{sig}$ to the first input of differential amplifier 48 results in a proportional signal on the output thereof, which places transistor 50 in a conducting condition to thereby allow current to flow through the DC torque motor 54. As a result, DC torque motor 54 rotates the drum 32 in a counterclockwise direction, thereby causing opposite translations of the scale tape 26 and index tape 28, as previously described. Simultaneously, the wiper arm 56A rotates with drum 32 and provides an increasing signal to the second input of differential amplifier 48 so that the signal on the output thereof is progressively reduced. Accordingly, the current flow through transistor 50 is also progressively reduced until such a time that the torque being exerted on drum 32 by DC torque motor 54 produces a force on index tape 28 which balances the opposite force being exerted on index tape 28 by the spring-biased reel 40. At this time, counterclockwise rotation of drum 32 terminates and the scale tape 26 and index tape 28 have been relatively displaced so as to indicate the value of the input signal $V_{sig}$. It will be appreciated that a change in the input signal $V_{sig}$ would result in a consequent rotation of the drum 32 to a new equilibirium position so that the new value of the input signal $V_{sig}$ is indicated by consequent relative displacement of the scale tape 26 and index tape 28, and that removal of the input signal $V_{sig}$ will result in the drum 32 being returned to its rest position due to the forces exerted on index tape 28 by the spring-biased reel 40.

Figure 11:
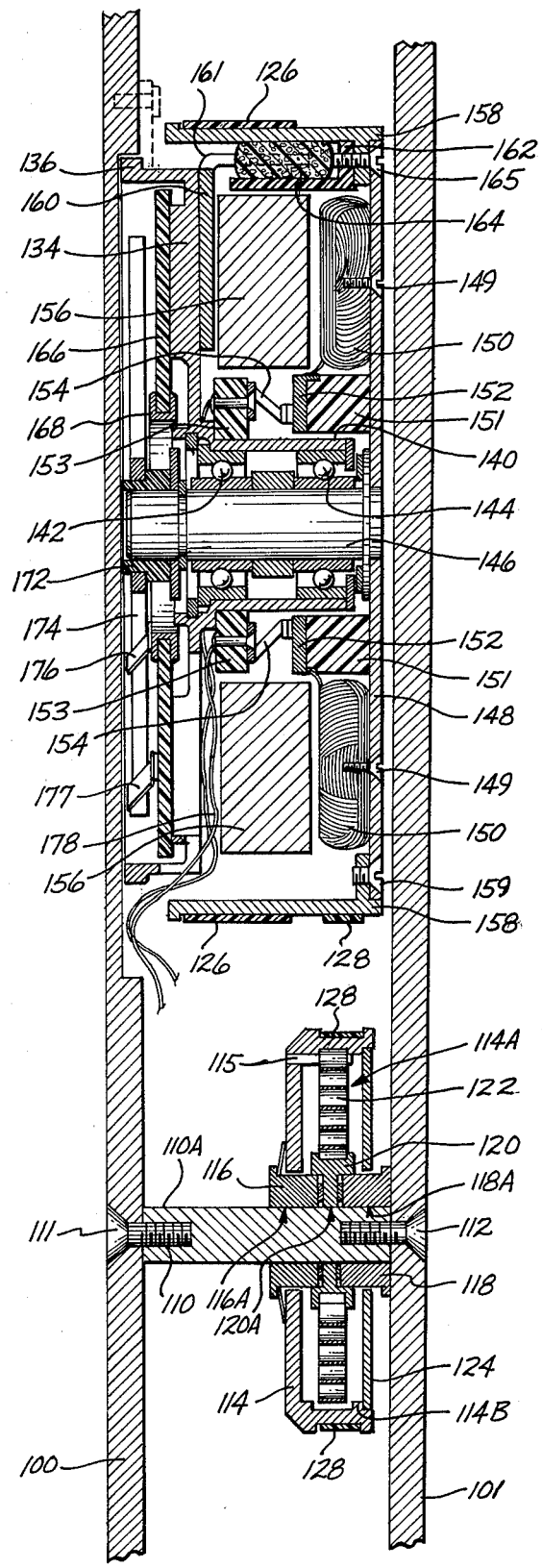

Now referring to FIGS. 10 and 11, a preferred embodiment of the electrical indicator of the present invention includes first and second, substantially rectangular plates 100, 101 which, together with a back member 102 and a front member 104, form the housing 20 (FIG. 1). Plates 100, 101 are separated from each other by a spacer 106, which is secured to plate 100 by a fastener 107 and to plate 101 by a fastener 108. A second spacer 110 extends between plates 100, 101 at a location adjacent the front member 104, and is secured to plate 100 by a fastener 111 and to plate 101 by a fastener 112. Supported by spacer 110 are a plurality of bushings 116, 118 and 120 which are kept from rotation on spacer 110 by engagement of flattened, inner surfaces 116A, 118A and 120A with an outer flattened key surface 110A on spacer 110. A reel 114 is rotatably supported on bushing 116 and has therein a cavity 114A in which is received a spiral coil spring 122, with a first end of the spiral coil spring 122 being secured to a pin 115 affixed to the reel 114 and located within the cavity 114A and with a second end of the coil spring 122 being secured to the bushing 120. The cavity 114A is closed by a washer 124 pressed into reel 114 to engage a shoulder 114B thereof and rotatably supported on bushing 118. An end 128B of an index tape 128 is secured to the peripheral surface of the reel 114, with index tape 128 passing around the peripheral surface of drum 114 from end 128B in a clockwise direction, and with coil spring 122 being positioned so as to exert a force on reel 114 to rotate reel 114 in a counterclockwise direction around spacer 110 and the supporting bushings 116, 118.

A circular recess 130 is provided in the surface of plate 100 which faces plate 101 and is located adjacent the front member 104 but above the location of the spacer 110. A core member 132 forming part of both a DC torque motor and a potentiometer includes a substantially cylindrical support disc 134 having a circumferential lip 136 which is received in the recess 130. The support disc 134 is secured to the plate 100 by three clips 138 which are fastened to plate 100 by fasteners 139 and which bear against circumferential lip 136.

The support disc 134 has extending therefrom an integral, centrally-located cylindrical projection 140 through which extends an aperture in which are located bearing sets 142, 144 for rotatably supporting an elongated cylindrical shaft 146. Affixed to one end of the shaft 146 is a circular plate 148 to which is attached, by means of a plurality of fasteners 149, an annular armature winding 150. Integrally formed with armature winding 150 is a central support disc 151 of insulating material which bears thereon a commutator 152 which is electrically interconnected with the armature winding 150. As best seen in FIG. 11, the support disc 151 and armature winding 150 surround the cylindrical projection 140 in assembly, with the commutator 152 facing the support disc 134.

A support disc 153, also of insulating material, is carried by cylindrical projection 140 and supports a pair of spring contact arms 154 which engage the commutator 152 in assembly. A pair of electrical conductors forming part of conductors 178 are terminated in the spring contact arms 154 to serve as electrical terminals to the DC torque motor, which is completed by an annular permanent magnet 156 affixed to support disc 134 and surrounding cylindrical projection 140 to face armature winding 150 in assembly. Upon application of an electrical signal to the pair of spring contact arms 154 through the associated electrical conductors 178, the magnetic flux generated by current through the armature winding 150 interacts with that provided by permanent magnet 156 to rotate the circular plate 148 and shaft 146 with respect to cylindrical projection 140 of the support disc 134.

A drum 158 is affixed to circular plate 148 by means of a plurality of fasteners 159 so as to surround the core 132 in assembly, and has attached thereto the ends 126A, 126B and a scale tape 126 as discussed hereinafter. A stop member 160 is affixed to support disc 134 and has an arm 161 which extends parallel to cylindrical projection 140 and between the permanent magnet 156 and drum 158 in assembly. A cushion 164 is supported from a mount 162 affixed to the drum 158 and plate 148 by a fastener 165 and also extends between the permanent magnet 156 and drum 158 in assembly, with the cushion 164 contacting the arm 161 upon rotation of the drum 158 to its rest position and also upon rotation of the drum 158 for slightly less than 360° of revolution from the rest position.

Also affixed to the support disc 134 is a disc 166 formed partly of resistive material. Although not illustrated in the drawings, the resistive material in disc 166 is in the form of a split ring, a surface of which faces plate 100 in assembly. The ends of the split ring are each electrically interconnected to an electrical conductor forming part of conductors 178 to thereby form the fixed ends of a potentiometer. Centrally located in disc 166 and surrounding shaft 146 in assembly is a contact ring 168, of conductive material, with which is electrically interconnected a conductor forming apart of the conductors 178. A spider 170 is supported on a hub 172 of insulating material pressed onto an end of shaft 146 and rotatable therewith, with the spider 170 having an integral arm 174 which supports first and second, electrically-connected spring contact arms 176, 177. Spring contact arm 176 presses against contact ring 168 in assembly, and spring contact arm 177 presses against the resistive split-ring in disc 166 in assembly to form a wiper for the potentiometer.

The electrical conductors 178 are brought out from the core 132 and maintained in place by a clip 180 affixed to the plate 100 by a plurality of fasteners 181, and then directed to a printed circuit board, not illustrated, on which are located the remaining electrical components of the indicator (such as those illustrated in FIG. 9).

The front member 104 is rectangular in configuration. Rotatably supported in an upper end of front member 104 are a pair of adjacent rollers 190, 192, and rotatably supported in a lower end of front member 104 are a pair of adjacent rollers 194, 196. A face plate 198 is secured, by means not illustrated, in proximity to a front surface of the front member 104, with the face plate 198 including a rectangular window 200 through which a portion of the front surface of front member 104 between rollers 190, 192 and 194, 196 can be viewed in assembly. A pair of spaced-apart arms 202 are pivotally secured to a rear surface of front member 104 by a pin 203, and a tensioning roller 204 is rotatably supported on a shaft 205 extending between the pair of arms 202. A pair of springs 206 have a first end thereof secured to respective ones of the pair of arms 202 and a second end thereof secured to the rear surface of the front member 104, by means not illustrated, so as to pull upwardly on the pair of arms 202.

The rollers 190, 194, and the tensioning roller 204, have a width substantially equal to that of the scale tape 126, whereas the rollers 192, 196 have a width substantially equal to that of the index tape 118.

In assembly, a first end 128A of the index tape 128 is attached to the peripheral surface of the drum 158, by means not illustrated, at a location similar to the attachment of the first end 128A of the index tape 28 to the drum 32 in FIG. 5. From the end 128A, the index tape 128 proceeds in a clockwise direction around a portion of the peripheral surface of drum 158, over roller 192, past the portion of the front surface of front member 104 which is viewable through window 200, over roller 196, and around the peripheral surface of reel 114 to terminate in the second end 128B. A first end of the scale tape 126A is attached to a portion of the peripheral surface of the drum 158, by means not illustrated, at a location similar to the attachment of the first end 26A of the scale tape 26 to the drum 32 in FIG. 4. From the end 126A, the scape tape 126 then passes around a portion of the peripheral surface of drum 158 in a counterclockwise direction, over roller 190, past the portion of the front surface on front member 104 which is viewable through window 200, over roller 194, through the pair of arms 202 and then over the roller 204 to terminate in a second end 126B which is attached to the peripheral surface of the drum 158 at a location similar to the attachment of the second end 26B of scale tape 26 to the drum 32 in FIG. 4.

In operation, counterclockwise rotation of drum 158, in response to the application of an electrical signal to the armature winding 150 through the pair of spring contact arms 154 and the commutator 152, causes the index tape 28 to be taken up onto the peripheral surface of the drum 158 and to be taken off the peripheral surface of the reel 114, with the index thereon moving upwardly as viewed through window 200. At the same time, scale tape 126 is taken off the top of the peripheral surface of drum 158 and taken onto the bottom of the peripheral surface of the drum 158 so that the scale thereon moves downwardly as viewed through window 200. The actual position of drum 158 with respect to its rest position is indicated by an electrical signal obtained from the contact ring 168 coupled to the resistive split ring in disc 166 through spring contact arms 176 and 174.

Even though the electrical indicator of the present invention offers increased resolution over prior art electrical indicators, its power consumption is substantially the same as such prior art electrical indicators since the only substantial power-consuming element, i.e., the DC torque motor, is constructed in a similar manner to that used in the prior art. It will also be appreciated that such increased resolution is afforded by the use of very few additional components, these being the scale tape 126A, the rollers 190, 194, and the tensioning roller 204 and its associated components.

While the invention has been described with respect to a preferred embodiment, it is to be clearly understood by those skilled in the art that the invention is not limited thereto, but rather is to be interpreted only in accordance with the appended claims.

What is claimed is:

1. In an electrical indicator of the type including a housing having defined therein an elongated window having first and second ends; a DC torque motor supported within the housing and having a drum rotatable in response to an electrical signal; a first elongated tape having an index located thereon, the first tape having a first end attached to a peripheral surface of the drum; first and second rollers supported within the housing in proximity to the first and second ends of the elongated window, respectively; and a spring-biased, rotatable reel supported within the housing; the first tape passing from its first end in a first circumerential direction around a portion of the peripheral surface of the drum, over the first roller, and then over the second roller to terminate in a second end attached to a peripheral surface of the reel, the reel tending to cause the first tape to translate in a first direction past the window, and the DC torque motor rotating the drum in response to the electrical signal to tend to cause the first tape to translate in a second, opposite direction past the window, an improvement comprising:

third and fourth rollers supported within the housing in proximity to the first and second ends of the window and adjacent to the first and second rollers, respectively; a second elongated tape having a plurality of spaced scale markings located thereon, a first end of said second tape being attached to the peripheral surface of the drum so that said second tape lies on the peripheral surface of the drum in spaced parallel relationship to the first tape, said second tape passing around a second portion of the peripheral surface of the drum in a second circumferential direction, opposite to the first circumferential direction, over said third roller, and then over said fourth roller to terminate in a second end attached to the peripheral surface of the drum at a location adjacent said first end of said second tape; and, means for tensioning said second tape as it passes around and over the drum and said third and fourth rollers, whereby said second tape translates in the first and second directions past the window as the first tape translates in the second and first directions past the window, respectively, in response to the forces exerted on the first tape and said second tape by the DC torque motor and the spring-biased reel.

2. An improvement as recited in claim 1, wherein said tensioning means includes a fifth roller supported within the housing, and means also supported within the housing for urging said fifth roller against said second tape at a location between said third and fourth rollers and the drum.

3. An improvement as recited in claim 2, further including at least one arm having a first end rotatably supporting said fifth roller and a second end pivotally secured to the housing, and spring means attached to the housing and to said first end of said arm for urging said fifth roller against said second tape.

4. An improvement as recited in claim 3, wherein said arm and said spring means are secured to the housing at a location so as to urge said fifth roller against a portion of said second tape extending between said fourth roller and the drum.

5. An electrical indicator comprising:
(a) a housing having defined therein an elongated window having first and second ends;
(b) a DC torque motor supported within said housing and having a drum rotatable in response to an electrical signal;
(c) a first elongated tape having an index located thereon, said first tape having a first end attached to the peripheral surface of said drum;
(d) first and second rollers respectively supported within said housing in proximity to said first and second ends of said elongated window, respectively;
(e) a spring-biased, rotatable reel supported within the housing;
(f) said first tape passing from its first end in a first circumferential direction around a portion of the peripheral surface of said drum, over said first roller, and then over said second roller to terminate in a second end attached to a peripheral surface of said reel, said reel tending to cause said first tape to translate in a first direction past said window and said DC torque motor rotating said drum in response to the electrical signal to tend to cause said first tape to translate in a second, opposite direction past said window;
(g) third and fourth rollers supported within said housing in proximity to said first and second ends of said window and adjacent to said first and second rollers, respectively;

(h) a second elongated tape having a plurality of spaced scale markings located thereon, a first end of said second tape being attached to the peripheral surface of said drum so that said second tape lies on said peripheral surface in spaced parallel relationship to said first tape, said second tape passing around a second portion of said peripheral surface in a second circumferential direction, opposite to said first circumferential direction, over said third roller, and then over said fourth roller to terminate in a second end attached to said peripheral surface of said drum at a location adjacent said first end of said second tape; and,
(i) means supported within said housing for tensioning said second tape as it passes around and over said drum and said third and fourth rollers, whereby said second tape translates in said first and second directions past said window as the first tape translates in said second and first directions past said window, respectively, in response to the forces exerted on said first and second tapes by said DC torque motor and said spring-biased reel.

6. An indicator as recited in claim 5, wherein said DC torque motor includes:
(a) a substantially cylindrical support disc, said support disc having extending therefrom an integral, centrally-located cylindrical projection through which extends an aperture;
(b) means securing said support disc to said housing;
(c) an elongated shaft rotatably supported within said cylindrical projection, said elongated shaft having first and second ends extending from said cylindrical projection;
(d) a circular plate affixed to said first end of said shaft;
(e) means securing said drum to said circular plate so that said drum is coaxial with said projection and said shaft;
(f) an annular permanent magnet fixedly secured to said support disc so as to be coaxial with said projection and to underlie said drum;
(g) an armature means secured to and rotatable with said circular plate and said drum so as to be coaxial with said cylindrical projection and to underlie said drum; and,
(h) contact means for applying the electrical signal to said armature means.

7. An indicator as recited in claim 6, further comprising a potentiometer, said potentiometer including:
(a) a disc formed partly of resistive material, said disc being fixedly secured to said support disc and coaxial with said shaft in proximity to said second end thereof, said resistive material in said disc having first and second ends adapted to form first and second electrical terminals of said potentiometer, said disc also having located therein a contact ring of conductive material which is coaxial with said shaft and which is adapted to form a wiper electrical terminal of said potentiometer; and,
(b) a spider attached to said second end of said shaft and rotatable with said shaft, said spider having located thereon first and second, electrically-interconnected spring contact arms, each of conductive material, said first and second spring contact arms rotatably engaging said resistive material and said contact ring, respectively of said disc.

8. An electrical indicator as recited in claim 5, wherein said housing includes a front member having an elongated surface, and a face plate having said window defined therein, said face plate being secured to said housing so that said window overlies a portion of said elongated surface of said front member, said first and said third rollers being rotatably supported in said front member adjacent said first end of said window and said second and fourth rollers being rotatably supported in said front member adjacent said second end of said window.

9. An electrical indicator as recited in claim 5, further comprising potentiometer means operative to provide an output signal proportional to the amount of rotation of said drum; amplifier means having first and second inputs and an output, said amplifier means being operative to provide a signal at its output which is proportional to the difference between signals applied to said first and second inputs; means coupling an input signal to be measured and displaced by the electrical indicator to said first input of said amplifier means; feedback means coupling the output signal from said potentiometer to said second input of said differential amplifier means; and drive means controlling the electrical signal applied to said DC torque motor in response to the signal on the output of said amplifier means.

10. In an electrical indicator of the type including a housing having defined therein an elongated window having first and second ends; drive means supported within the housing and having a drum rotatable in response to an electrical signal; a first elongated tape having an index located thereon, the first tape having a first end attached to a peripheral surface of the drum; first and second guide means for the first elongated tape, the first and second guide means being supported within the housing in proximity to the first and second ends of the elongated window, respectively; and reel means supported within the housing; the first tape passing from its first end in a first circumerential direction around a portion of the peripheral surface of the drum, over the first guide means, and then over the second guide means to terminate in a second end attached to a peripheral surface of the reel means, the reel means tending to cause the first tape to translate in a first direction past the window and the drive means rotating the drum in response to the electrical signal to tend to cause the first tape to translate in a second, opposite direction, past the window, an improvement comprising:

third and fourth guide means for a second elongated tape, said third and fourth guide means being supported within the housing in proximity to the first and second ends of the window and adjacent to the first and second guide means, respectively; a second elongated tape having a plurality of spaced scale markings located thereon, a first end of said second tape being attached to the peripheral surface of the drum so that said second tape lies on the peripheral surface of the drum in spaced parallel relationship to the first tape, said second tape passing around a second portion of the peripheral surface of the drum in a second circumferential direction, opposite to the first circumferential direction, over said third guide means, and then over said fourth guide means to terminate in a second end attached to the peripheral surface of the drum at a location adjacent said first end of said second tape; and, means for tensioning said second tape as it passes around and over the drum and said third and fourth guide means, whereby said second tape translates in the first and second directions past the window as the first tape translates in the second and first directions past the window, respectively, in response to the forces exerted on the first tape and said second tape by the drive means and the reel means.

* * * * *